US006328297B1

(12) United States Patent
Antonelli et al.

(10) Patent No.: US 6,328,297 B1
(45) Date of Patent: Dec. 11, 2001

(54) METHOD AND APPARATUS FOR IMPROVING SYNCHRONIZATION IN A DOCUMENT INSERTING SYSTEM

(75) Inventors: Nicholas R Antonelli, Danbury, CT (US); John W. Sussmeier, Cold Spring, NY (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/346,523

(22) Filed: Jul. 2, 1999

(51) Int. Cl.[7] .................. B65G 43/08

(52) U.S. Cl. .................. 270/52.16; 270/58.29; 270/52.14; 198/349.95

(58) Field of Search .................. 270/52.14, 52.16, 270/52.26, 52.29, 58.02, 58.29; 198/810.01, 810.04, 349.95

(56) References Cited

U.S. PATENT DOCUMENTS 3,702,187 * 11/1972 Hageman et al. .................. 271/101
3,825,247 * 7/1974 Fernandez-Rana et al. ...... 270/58.29
5,730,436 * 3/1998 Viebach et al. .................. 270/52.16
5,918,729 * 7/1999 Chang .................. 198/810.04
5,957,263 * 9/1999 Espenschied .................. 198/349.95
6,082,724 * 7/2000 Kahlig et al. .................. 270/52.14

* cited by examiner

*Primary Examiner*—Christopher P. Ellis
*Assistant Examiner*—Patrick Mackey
(74) *Attorney, Agent, or Firm*—Michael J. Cummings; Michael E. Melton

(57) ABSTRACT

A method and apparatus for improving the timing between the releasing of documents from enclosure feeders and the arrival of pusher fingers fixedly attached to a conveyer belt in a gathering section of an inserting machine. As the conveyer belt begins to wear and stretch after being used for a long period of time, the timing between the releasing of documents and the arrival of pusher fingers may no longer be appropriate. By using two sensors placed, preferably, at the two ends of the gathering section to measure the timing of the arrival of the pusher fingers at the sensors, the stretch of the chain can be determined and the delay of the arrival of a pusher finger at each enclosure feeder can be calculated. Adjustment to the releasing timing at each enclosure feeder can be made accordingly.

3 Claims, 2 Drawing Sheets

METHOD AND APPARATUS FOR IMPROVING SYNCHRONIZATION IN A DOCUMENT INSERTING SYSTEM

TECHNICAL FIELD

The present invention relates to enclosure feeders in an inserting machine for mass mailing.

BACKGROUND OF THE INVENTION

In an inserting machine for mass mailing, there is a gathering section where the enclosure material is gathered before it is inserted into an envelope. This gather section is sometimes referred to as a chassis subsystem, which includes a gathering transport with pusher fingers rigidly attached to a conveying means and a plurality of enclosure feeders mounted above the transport. If the enclosure material contains many documents, these documents must be separately fed from different enclosure feeders. Each of the enclosure feeders feeds or releases a document at the appropriate time such that the trailing edge of the document released from the enclosure feeder is just slightly forward of a moving pusher finger. Timing and velocity control of all feeders are critical because during the feeding process a document is under the control of both an enclosure feeder motor and the gathering transport motor.

Currently one or more long endless chains driven by a single motor are used to move the pusher fingers in order to gather the enclosure material released from the enclosure feeders and send the gathered material to an envelope insertion station. It is preferable that the spacing of the pusher fingers attached to the conveying chain is substantially the same as the spacing of the enclosure feeders mounted above the conveying chain. A typical pitch for the enclosure feeders is 13.5" (343 mm). Depending on the length of the document stacked on a feeder, the feeder is given a "go" signal to release an enclosure document on the conveying belt at an appropriate time.

After the machine has run a prolonged period of time, the conveying chain begins to wear and stretch, as is the case with steel chains. Consequently, the timing that is predicted can be off a substantial amount from one end of the machine to the other. The amount can be accumulated through tolerances, and the stretch can reach an amount that equals the smaller document that may be fed. For example, in a 20 station machine with a length of 22.5 feet, the 2% stretch would equate to 5.4 inches. This is greater than the smallest document to be fed.

Therefore, it is desirable to provide a method and apparatus to improve the timing between the transport and the feeders which compensates for chassis chain stretch so that the distance between a pusher finger and the trailing edge of a fed enclosure document is appropriate.

SUMMARY OF THE INVENTION

The present invention provides a method and an apparatus for improving the timing between the enclosure feeders and the conveying chain in the gather section of an inserting machine. More specifically, the present invention uses two or more sensors and a processor to add an adjustment to the "go" signal timing for each of the enclosure feeders in a large chassis subsystem. If the spacing between two adjacent pusher fingers (without chain being stretched), or a pusher pitch, is equal to D, it is preferable to place a first sensor at one end of the chassis and a second sensor at a distance nD upstream from the first sensor, where n is a positive number and, preferably, an integer. With such sensors in place, the effective chain stretch can be calculated by multiplying the pusher speed by the time difference between the sensing of the arrival of a pusher finger by the first sensor and that by the second sensor. Assuming the stretch is linear throughout the conveying chain, an appropriate time delay can be determined and added to the "go" signal, or the releasing command, timing of a respective enclosure feeder in order to compensate for the problem associated with the wear and stretch of the conveying chain.

BRIEF DESCRIPTION OF THE DRAWINGS

The above and other objects and advantages of the present invention will become more readily apparent upon consideration of the following detailed description, taken in conjunction with accompanying drawings, in which like reference characters refer to like parts throughout the drawings, and in which.

DETAILED DESCRIPTION OF THE PREFERRED EMBODIMENTS

Figure 1:
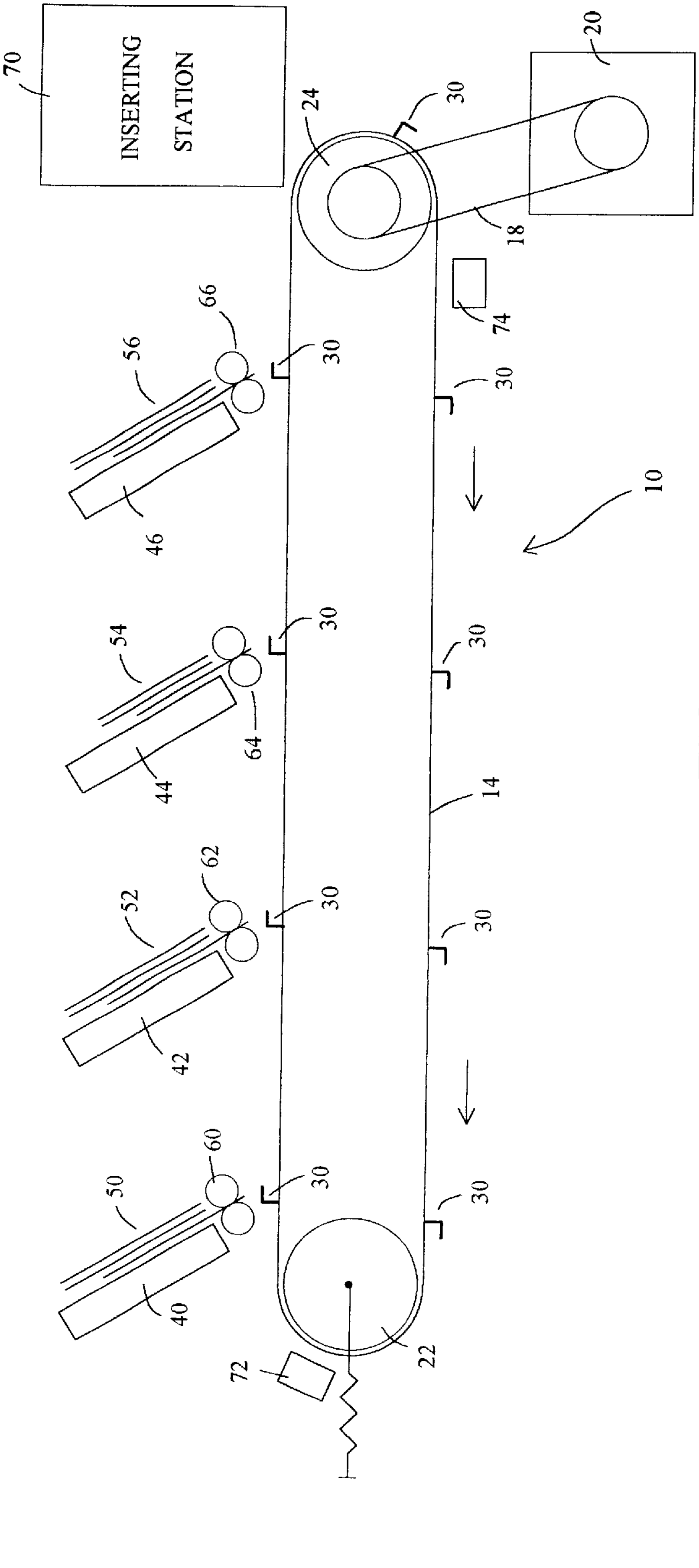
FIG. 1 is illustrates a gather section of an inserting machine.

FIG. 1 illustrates a typical gather section of an inserting machine. As shown in FIG. 1, the gather section, or the chassis subsystem 10, includes a conveyer belt, or an endless chain 14, to transport documents. A plurality of pusher fingers 30, equally spaced and rigidly attached to the endless chain 14. A driven sprocket 24, driven by a transport motor 20, an idler sprocket 22, and a belt 18, are used to move the chain 14. Idler sprocket 22 is adjustable so as to keep the tension of the chain 14 within a useful range. Chain 14 moves substantially at a constant speed and the pusher fingers move at the same speed along with the chain 14. Also shown FIG. 1 are a plurality of enclosure feeders 40, 42, 44 and 46 mounted above the chain 14 for feeding enclosure documents 50, 52, 54 and 56, respectively. Each enclosure feeder has a releasing mechanism 60, 62, 64 and 66 which releases one sheet of an enclosure document upon receiving a "go" signal or releasing command from the control system 80 of the inserter 10. The timing of the release command for each enclosure feeder is determined by the length of the enclosure document to be released and the arrival of a pusher finger 30 in proximity to one of the enclosure feeders 40, 42, 44 and 46.

It is to be appreciated that the design of the enclosure feeders are well known in the art, thus a detailed description is not needed. However, it is to be appreciated that each aforesaid releasing mechanism is controlled by an electronic signal, which signal preferably originates from the control system for the inserting system, the significance of which will become apparent below.

It is to be appreciated that chassis 10 of an inserter system is described herein as including four enclosure feeders 40, 42, 44 and 46. But it is of course to be appreciated that this number of enclosure feeders (e.g. 4) is only used for exemplary purposes only as chassis 10 may include any number of enclosure feeders.

In order to enable the pusher fingers 30 to properly push the released enclosure documents toward an envelope inserting station 70, it is preferred that the trailing edge of an enclosure document be released from an enclosure feeder 40, 42, 44 and 46 so that it is just slightly forward of a conveying pusher finger 30. Originally, the distance between two adjacent pusher fingers 30 is set substantially equal to the distance between two adjacent enclosure feeders (e.g., 42 and 44). As the chain 14 begins to wear, it may cause to stretch and, consequently, the aforesaid distance between adjacent pusher fingers 30 may be greater than the distance between two adjacent enclosure feeders (e.g., 42 and 44) . As a result, an enclosure document may be released prior to the arrival of a pusher finger 30 which is intended to convey the fed enclosure document causing a potential jam in the chassis 10 or in the envelope insertion station 70.

In order to compensate for the off-timing in the releasing command due to chain stretch as described above, a first sensor 72 is preferably placed at one end of the chassis 10 and a second sensor 74 is placed on another end of the chassis 10 upstream from the first sensor 72, and preferably is positioned along the circumference of drive sprocket 24. If the distance between two adjacent feeders (e.g., 42 and 44) is D, then it is preferred that the distance between the second and first sensors, 74 and 72, is equal to nD where n is a positive integer. For example, if the distance between two adjacent feeders (e.g., 42 and 44) is 13.5" (343 mm), then the distance between the second and first sensors 74 and 72 is set to be some integer increment of 13.5". As shown in FIG. 1, n=5 or 6 since there are four feeders 40, 42, 44 and 46, and two sensors 72 and 74. If the pusher pitch is exactly 13.5", then both sensors 72 and 74 detect the arrival of a moving pusher finger 30 at the same time.

However, due to the chain stretch, there is a time difference between the detection of a conveying pusher finger 30 by the first sensor 72 and that by the second sensor 74. For instance, if the time difference between the sensors 72 and 74 is 0.8 sec, then the delay in the time of arrival at a sensor 72 or 74, or at an enclosure feeder 40, 42, 44 or 46 between two adjacent pusher fingers 30 is 0.2 sec. Accordingly, a +0.2 sec delay is added to the releasing command timing for feeder 44, relative to the timing adjustment to feeder 46. Similarly, the adjustment to the releasing timing for feeder 40 is +0.6 sec. It is to be appreciated that in this method, it is not necessary to know the velocity of the chain 14.

Figure 2:
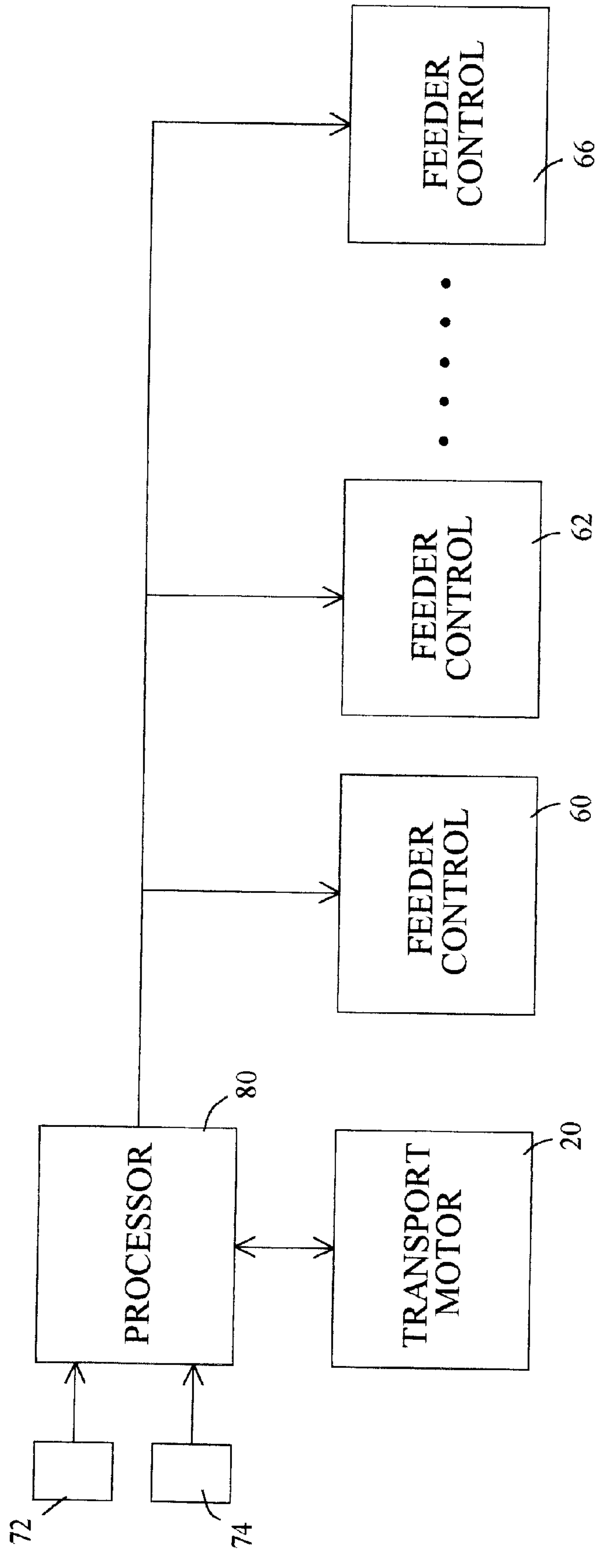
FIG. 2 is illustrates the apparatus for improving the timing in the gather section of an inserting machine, according to the present invention.

FIG. 2 illustrates the apparatus for improving the timing in the chassis section 10 of an inserting system. As shown, sensing signals, responsive to the arrival of pusher fingers 30, from sensor 72 and sensor 74 are provided to a processing means 80, preferably implemented in the control system of the inserting system, which determines the arrival time of a pusher finger 30 at each enclosure feeder 40, 42, 44 and 46 based on the sensing signals from the sensors 72 and 74. Processing means 80 also sends timing signals to each of the feeder controls 60, 62, 64, 66 in order to adjust the timing of the release command at each enclosure feeder 40, 42, 44, 46 in accordance with the determined arrival time.

If it is desired to determine the chain stretch, processor 80 may receive speed signals from transport motor 20. If the time difference between the arrival of a pusher finger at sensor 74 and sensor 72 is Dt and the chain speed is v, then the chain stretch between those two pushers finger is vDt. Since the distance between the sensors 72 and 74 is nD, the chain stretch between any two adjacent pusher fingers 30 is vDt/n, assuming the stretch is linear throughout the chain 14. It should be noted, however, that it is not necessary to know the chain speed v. The adjustment to the releasing command timing of an enclosure feeder 40, 42, 44 and 46, relative to the adjustment to the adjacent feeder downstream, is Dt/n.

Although the invention has been described with respect to a preferred version and embodiment thereof, it will be understood by those skilled in the art that the foregoing and various other changes, omissions and deviations in the in the form and detail thereof may be made without departing from the spirit and scope of this invention.

What is claimed is:

1. A system for synchronizing timing of a release of documents to be conveyed in a document inserting system comprising:

a chassis for conveying documents in a downstream direction;

a plurality of pusher fingers mounted on the chassis, the plurality of pusher fingers having an original unstretched uniform distance between adjacent upstream and downstream pusher fingers;

a plurality of document enclosure feeders for releasing documents onto the chassis, the document enclosure feeders in synchronization for releasing documents onto the chassis for gathering by the pusher fingers;

a first sensing element for sensing an arrival of a first pusher finger of the plurality of pusher fingers;

a second sensing element for sensing an arrival of a second pusher finger of the plurality of pusher fingers, the second sensing element spaced a predetermined distance upstream from the first sensing element; and a processor coupled to the first and second sensing elements for calculating a time delay between the arrival of the first pusher finger at the first sensing element and the arrival of the second pusher finger at the second sensing element, the processor adjusting the synchronization of the document enclosure feeders by delaying the release of documents from upstream document enclosure feeders relative to downstream document enclosure feeders as a function of the calculated time delay, wherein the predetermined distance between the first and second sensing elements is equal to an integer increment of said original unstretched uniform distance between adjacent upstream and downstream pusher fingers and the integer is n, and wherein the document enclosure feeders are spaced apart such that documents are released from adjacent upstream and downstream document enclosure feeders at substantially the original unstretched uniform distance between adjacent upstream and downstream pusher fingers, and the processor adjusts the synchronization of the release of documents from the document enclosure feeders by delaying the release of documents from upstream document enclosure feeders relative to the adjacent downstream document enclosure feeder by a time according to a formula Dt/n, where Dt is the time delay calculated by the processor.

2. The apparatus of claim 1 wherein said sensing elements include at least one optical sensor.

3. A method of synchronizing timing of a release of documents to be conveyed in a document inserting system having a chassis for conveying documents in a downstream direction, a plurality of pusher fingers mounted on the chassis, the plurality of pusher fingers having an original unstretched uniform distance between adjacent upstream and downstream pusher fingers, and a plurality of document enclosure feeders for releasing documents onto the chassis to be gathered by the pusher fingers, the method comprising:

synchronizing the release of documents from the document enclosure feeders to the chassis so that a trailing edge of the documents is slightly forward of one of the pusher fingers;

sensing an arrival of a first pusher finger of the plurality of pusher fingers at a first location;

sensing an arrival of a second pusher finger of the plurality of pusher fingers at a second location, the second location being a predetermined distance upstream from the first location;

calculating a time delay between the arrival of the first pusher finger at the first location and the arrival of the second pusher finger at the second location;

adjusting the synchronization of the document enclosure feeders by delaying the release of documents from upstream document enclosure feeders relative to downstream document enclosure feeders as a function of the calculated time delay;

wherein the predetermined distance between the first and second location is equal to an integer increment of said original unstretched uniform distance between adjacent upstream and downstream pusher fingers and the integer is n, and wherein the document enclosure feeders are spaced apart such that documents are released from adjacent upstream and downstream document enclosure feeders at the original unstretched uniform distance between adjacent upstream and downstream pusher fingers; and the step of adjusting the synchronization of the release of documents from the document enclosure feeders further comprises delaying the release of documents from upstream document enclosure feeders relative to the adjacent downstream document enclosure feeder by a time according to a formula Dt/n, where Dt is the time delay calculated by the processor.

* * * * *